(12) United States Patent
Schwarz et al.

(10) Patent No.: US 10,508,562 B2
(45) Date of Patent: Dec. 17, 2019

(54) GEARED TURBOFAN WITH FOUR STAR/PLANETARY GEAR REDUCTION

(71) Applicant: UNITED TECHNOLOGIES CORPORATION, Hartford, CT (US)

(72) Inventors: Frederick M. Schwarz, Glastonbury, CT (US); William G. Sheridan, Southington, CT (US); Michael E. McCune, Colchester, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 314 days.

(21) Appl. No.: 14/935,673

(22) Filed: Dec. 1, 2015

(65) Prior Publication Data

US 2017/0152756 A1 Jun. 1, 2017

(51) Int. Cl.
| | |
|---|---|
| *F16H 1/28* | (2006.01) |
| *F01D 15/12* | (2006.01) |
| *F01D 25/18* | (2006.01) |
| *F02K 3/06* | (2006.01) |
| *F16H 57/04* | (2010.01) |
| *F02C 7/36* | (2006.01) |

(52) U.S. Cl.
CPC ............ *F01D 15/12* (2013.01); *F01D 25/18* (2013.01); *F02C 7/36* (2013.01); *F02K 3/06* (2013.01); *F16H 1/28* (2013.01); *F16H 57/0479* (2013.01); *F16H 57/0486* (2013.01); *F05D 2220/36* (2013.01); *F05D 2240/50* (2013.01); *F05D 2260/40311* (2013.01); *F05D 2260/98* (2013.01)

(58) Field of Classification Search
CPC . F01D 15/12; F01D 25/18; F02C 7/36; F02K 3/06; F16H 57/0486; F16H 57/0479; F05D 2260/40311; F05D 2220/36; F05D 2240/50; F05D 2260/98
See application file for complete search history.

(56) References Cited

U.S. PATENT DOCUMENTS 3,726,615 A * 4/1973 Kolinski .................. F04C 2/36
418/199
4,251,987 A 2/1981 Adamson
(Continued)

FOREIGN PATENT DOCUMENTS

JP 2008209010 A * 9/2008 ........... F16H 57/082
WO 2013/155260 A1 10/2013
(Continued)

OTHER PUBLICATIONS

English Translation of JP2008209010A; http://translationportal.epo.org; Jul. 22, 2019 (Year: 2019).*
(Continued)

*Primary Examiner* — Roger L Pang
(74) *Attorney, Agent, or Firm* — Carlson, Gaskey & Olds, P.C.

(57) ABSTRACT

A gas turbine engine has a fan rotor, a turbine rotor driving the fan rotor, and an epicyclic gear reduction positioned between the fan rotor and the turbine rotor. The epicyclic gear reduction includes a ring gear, a sun gear, and no more than four intermediate gears that engage the sun gear and the ring gear. The fan drive turbine is configured to drive the sun gear to, in turn, drive the ring gears to, in turn, drive the fan rotor.

16 Claims, 2 Drawing Sheets

(56) References Cited

U.S. PATENT DOCUMENTS

| | | | |
|---|---|---|---|
| 8,257,024 B1* | 9/2012 | Phillips | F01D 25/18 184/104.1 |
| 8,484,942 B1* | 7/2013 | McCune | F01D 25/18 184/6.12 |
| 8,678,743 B1 | 3/2014 | Sheridan et al. | |
| 8,753,065 B2 | 6/2014 | Sheridan et al. | |
| 8,807,916 B2 | 8/2014 | Sheridan et al. | |
| 8,814,494 B1 | 8/2014 | Sheridan et al. | |
| 2008/0251043 A1* | 10/2008 | Li | F01C 1/077 123/184.21 |
| 2010/0331139 A1* | 12/2010 | McCune | F02C 7/06 475/331 |
| 2012/0272762 A1* | 11/2012 | Sheridan | F02C 7/36 74/412 R |
| 2013/0192201 A1 | 8/2013 | Kupratis et al. | |
| 2013/0255274 A1 | 10/2013 | Kupratis et al. | |
| 2013/0269479 A1 | 10/2013 | Van der Merwe et al. | |
| 2013/0331222 A1* | 12/2013 | Richards | F01D 25/18 475/331 |
| 2016/0245390 A1 | 8/2016 | Mitsch | |
| 2017/0002687 A1* | 1/2017 | Dolman | F01D 25/20 |
| 2017/0114784 A1* | 4/2017 | Parnin | F01D 25/20 |

FOREIGN PATENT DOCUMENTS

| | | |
|---|---|---|
| WO | 2015/050619 A2 | 4/2015 |
| WO | 2015065720 A1 | 5/2015 |
| WO | 2018/052616 A1 | 3/2018 |

OTHER PUBLICATIONS

European Search Report for European Application No. 16201810.5 dated Mar. 29, 2017.

Johnston, R.P., Hirschkron, R., Koch, C.C., Neitzel, R.E., and Vinson, P.W. (1978). Energy efficient engine: Preliminary design and integration study-final report. NASA CR-135444. Sep. 1978. pp. 1-401.

Johnston, R.P. and Hemsworth, M.G. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Anderson, R.D. (1985). Advanced Propfan Engine Technology (APET) definition study, single and counter-rotation gearbox/pitch change mechanism design NASA CR-168115. Jul. 1, 1985. pp. 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P.(1975). Quiet Clean Short-Haul Experimental Engine (QCSEE) design rationale. Society of Automotive Engineers. Air Transportation Meeting. Hartford, CT. May 6-8 1975. pp. 1-9.

NASA Conference Publication. (1978). CTOL transport technology. NASA-CP-2036-PT-1. Jun. 1, 1978. pp. 1-531.

* cited by examiner

GEARED TURBOFAN WITH FOUR STAR/PLANETARY GEAR REDUCTION

BACKGROUND OF THE INVENTION

This application relates to a geared gas turbine engine, wherein a gear reduction is provided with only four star gears.

Gas turbine engines are known and typically include a fan delivering air into a bypass duct as bypass air and into a compressor. The air delivered into the compressor is mixed with fuel and ignited. Products of this combustion pass downstream over turbine rotors driving them to rotate. The turbine rotors, in turn, drive the compressor and fan rotors.

Historically, a fan rotor was driven at the same speed as a fan drive turbine rotor. This somewhat limited the design of the gas turbine engine. It was desirable that the fan rotate at a slower speed and have an increased diameter. However, it was also desirable that the turbine rotate at faster speeds. Thus, compromises had to be made.

More recently, a gear reduction has been incorporated between the fan drive turbine and the fan rotor. This has allowed the size of the fan rotor to increase. At the same time, the turbine rotor can rotate at increased speed.

The gear reductions utilized today have utilized epicyclic planetary or star gear reductions. These gear reductions have always utilized at least five star gears between a sun gear and a ring gear. This has limited the available gear ratios.

SUMMARY OF THE INVENTION

In a featured embodiment, a gas turbine engine has a fan rotor, a turbine rotor driving the fan rotor, and an epicyclic gear reduction positioned between the fan rotor and the turbine rotor. The epicyclic gear reduction includes a ring gear, a sun gear, and no more than four intermediate gears that engage the sun gear and the ring gear. The fan drive turbine is configured to drive the sun gear to, in turn, drive the ring gears to, in turn, drive the fan rotor.

In another embodiment according to the previous embodiment, the sun gear defines a sun gear center axis and a top dead center point is defined at a vertically uppermost location of the ring gear, with a center point of a top two of the four intermediate gears being at a spacing angle from a line drawn between the top dead center point and the sun gear center axis.

In another embodiment according to any of the previous embodiments, the spacing angle is at least about 15 degrees.

In another embodiment according to any of the previous embodiments, the spacing angle is at least about 30 degrees.

In another embodiment according to any of the previous embodiments, the spacing angle is 45 degrees.

In another embodiment according to any of the previous embodiments, a bypass ratio is defined as a volume of air delivered by the fan into a bypass duct compared to a volume of air delivered into a compressor.

In another embodiment according to any of the previous embodiments, the bypass ratio is greater than or equal to about 12.0.

In another embodiment according to any of the previous embodiments, the gear reduction has a gear ratio between the speed of a drive input to the sun gear, and an output speed of the fan rotor and the gear ratio is greater than or equal to about 2.6.

In another embodiment according to any of the previous embodiments, the gear ratio is greater than or equal to about 4.0.

In another embodiment according to any of the previous embodiments, the gear ratio is greater than or equal to about 4.2.

In another embodiment according to any of the previous embodiments, the gear ratio is less than or equal to about 4.4.

In another embodiment according to any of the previous embodiments, the fan drive turbine has three or four stages of blades.

In another embodiment according to any of the previous embodiments, an auxiliary oil supply system provides oil to journal bearings associated with the four intermediate gears during a windmilling condition of the fan rotor.

In another embodiment according to any of the previous embodiments, at least one blade row in the turbine rotor has blades formed of a directionally solidified material.

In another embodiment according to any of the previous embodiments, the gear reduction has a gear ratio between the speed of a drive input to the sun gear, and an output speed of the fan rotor and the gear ratio is greater than or equal to about 2.6.

In another embodiment according to any of the previous embodiments, the gear ratio is greater than or equal to about 4.0.

In another embodiment according to any of the previous embodiments, the gear ratio is greater than or equal to about 4.2.

In another embodiment according to any of the previous embodiments, the fan drive turbine has three or four stages of blades.

In another embodiment according to any of the previous embodiments, an auxiliary oil supply system provides oil to journal bearings associated with the four intermediate gears during a windmilling condition of the fan rotor.

In another embodiment according to any of the previous embodiments, at least one blade row in the turbine rotor has blades formed of a directionally solidified material.

These and other features may be best understood from the following drawings and specification.

DETAILED DESCRIPTION

Figure 1:
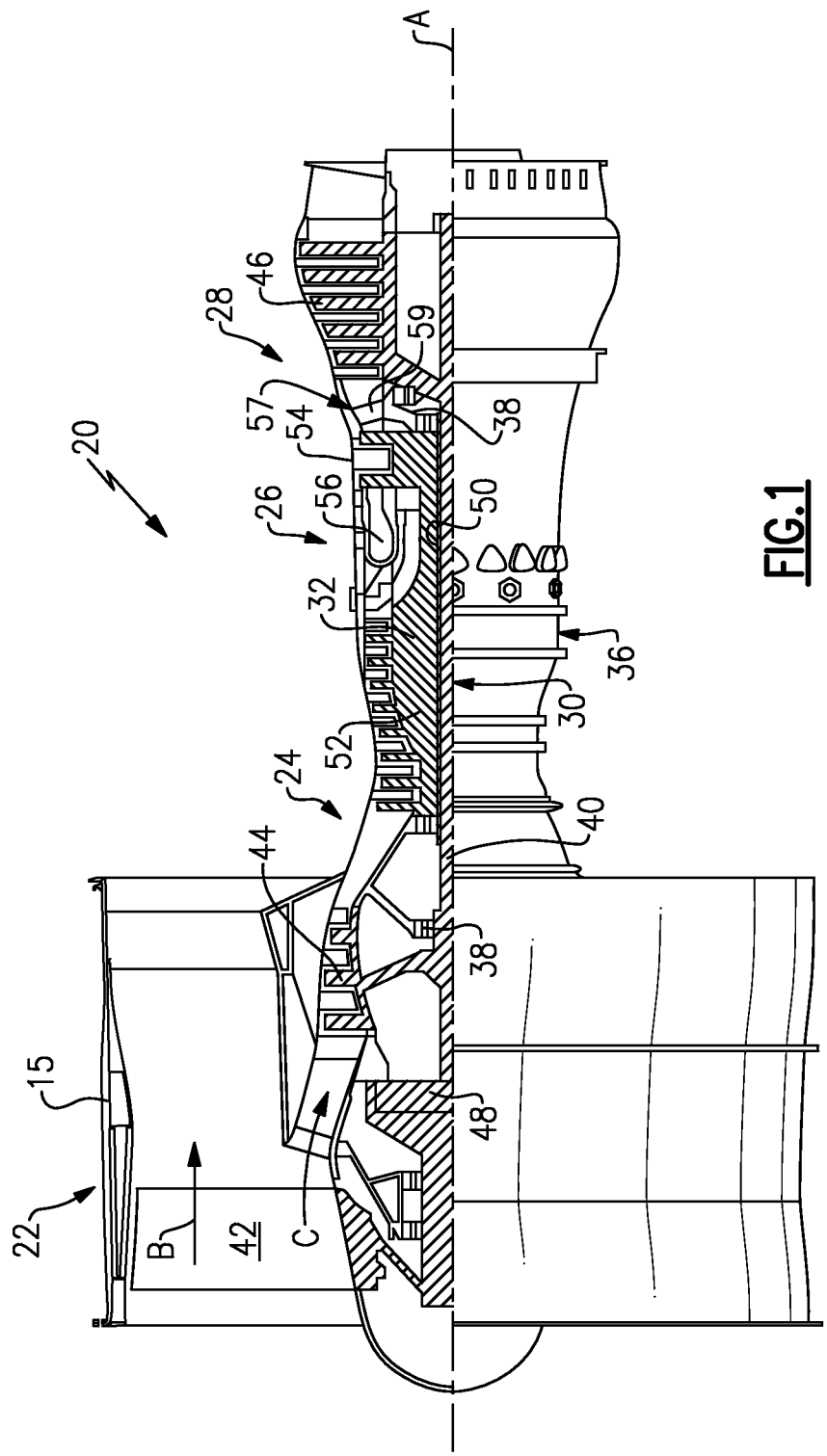
FIG. 1 shows a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2A:
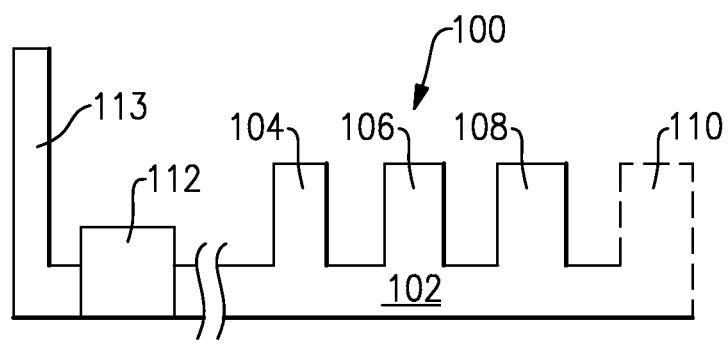
FIG. 2A schematically shows an embodiment of a gas turbine engine incorporating an embodiment of a gear reduction.

FIG. 2A shows a gas turbine engine 100 having a fan drive turbine 102 including three stages of blades 104, 106 and 108. An optional fourth stage 110 is also shown. With the arrangement of this disclosure, the fan drive turbine will preferably utilize at least three and sometimes four stages. Stated another way, the fan drive turbine has greater than or equal to three stages.

A gear reduction 112 is included between the fan drive turbine 102 and a fan rotor 113. The fan drive turbine 102 may be similar to the low pressure turbine as utilized in FIG. 1, and also directly drives a low pressure compressor stage. Alternatively, the engine 100 may include three turbine rotors with a high pressure turbine rotor driving a high pressure compressor, an intermediate pressure turbine rotor driving an intermediate pressure compressor, and a low pressure turbine rotor being the fan drive turbine.

Figure 2B:
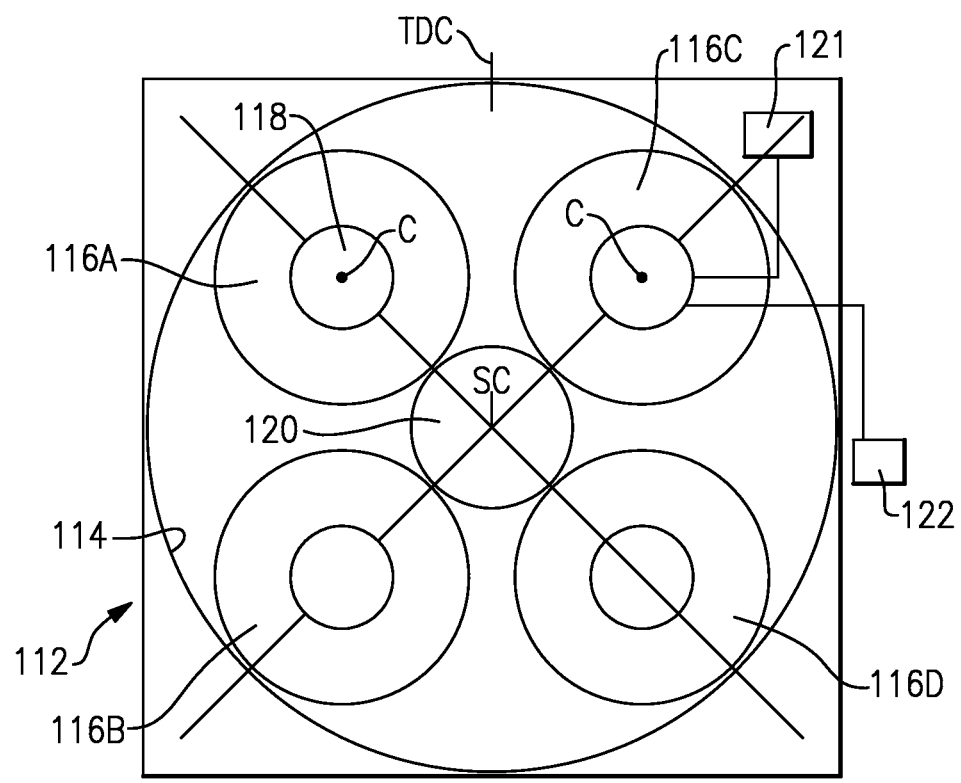
FIG. 2B schematically shows a gear arrangement within an embodiment of an epicyclic gear reduction.

FIG. 2B shows details of the gear reduction 112. A ring gear 114 (shown partially) surrounds four intermediate gears 116A, 116B, 116C, and 116D, which can be either star (shown) or planetary gears. A sun gear 120, which is driven by the fan drive turbine 102, is positioned within the star gears 116A-116D. Journal bearings 118 mount the star gears 116A-116D.

As known, the gear reduction is connected to drive the fan rotor in a manner as known in the art.

With a four star epicyclic gear reduction, gear ratios that are much higher than available with the prior art five stage (or more) gear reductions can be achieved. As an example, a five star gearbox has a limited gear ratio of about 3.06. This limits how fast the fan drive turbine can rotate and how slow the fan rotor can rotate.

However, with the disclosed four star epicyclic gear reduction, gear ratios of greater than 2.6 and up to about 4.4 can be achieved. In one embodiment, a gear ratio of greater than or equal to about 4.0 is achieved. In another embodiment, a gear ratio of greater than or equal to about 4.2 is achieved.

Moreover, the fan drive turbine is provided with three or four stages and can turn much faster than a turbine driving the prior epicyclic gear reductions utilizing five or more star gears. As an example, the fan drive turbine 102 can turn 37 percent faster than an example fan drive turbine in a gas turbine engine having an epicyclic gear reduction with five or more star gears.

It is conventional wisdom that gear reductions having fewer star gears may raise some other undesirable characteristics. In particular, as the number of star gears decreases for a given ring gear diameter, the sun gear's diameter becomes smaller. Further, the sun gear has fewer teeth and may see higher gear stresses. Further, the space for the drive input shaft from the fan drive turbine into the sun gear becomes smaller. Thus, the benefits of a four star gear reduction are unexpected. Still, while utilizing four star gears provides desirable characteristics, even fewer star gears may not be desirable.

As the fan drive turbine 102 begins to turn more quickly, the temperatures it may see also increase. Thus, it may be desirable to form at least one row, and perhaps all of the rows, of the blades in the fan drive turbine 102 from directionally solidified blade materials.

In addition, with this arrangement, bypass ratios of greater than or equal to about 10.0 can be achieved. In addition, bypass ratios of greater than or equal to about 12.0 and even 14.0 may be achieved.

An auxiliary oil circuit is shown schematically at 121. This oil circuit will provide oil to the journal bearings 118 whenever there is rotation of the fan rotor. Thus, during windmilling oil will be provided. Of course, there is also a primary oil supply system 122. The details of circuits 121 and 122 may be as known.

As shown in FIG. 2B, the center point C of the top gears 116A and 116C are spaced by 45 degrees from a top dead center point TDC. It is known that the greatest stresses induced between the gears 114 and 116 would be at the top dead center point TDC. Thus, spacing the gears from that point reduces the challenges the gears will face. Stated otherwise, the center point of the star gears measured from a center point SC of the sun gear is spaced from the top dead center TDC by an angle of at least about 15 degrees. In embodiments, the spacing angle is at least about 30 degrees. As mentioned, in one embodiment, the spacing angle is 45 degrees.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan rotor mounted within a nacelle and for delivering air into a bypass duct with said nacelle and into a low pressure compressor;
   a turbine rotor driving said fan rotor;
   an epicyclic gear reduction positioned between said fan rotor and said turbine rotor, said epicyclic gear reduction including a ring gear, a sun gear, and no more than four star gears that engage said sun gear and said ring gear,
   wherein said turbine rotor is for driving said sun gear to, in turn, drive said star gears to, in turn, drive said fan rotor;
   said turbine rotor for driving said low pressure compressor at a common speed, and driving said sun gear to drive said fan rotor at a reduced speed; and
   wherein said sun gear defines a sun gear center axis and a top dead center point is defined at a vertically uppermost location of said ring gear, with a center point of a top two of said four star gears being at a spacing angle from a line drawn between said top dead center point and said sun gear center axis, wherein said spacing angle is at least 30 degrees.

2. The gas turbine engine as set forth in claim 1, wherein said spacing angle is 45 degrees.

3. The gas turbine engine as set forth in claim 1, wherein said bypass ratio is defined as a volume of air delivered by said fan into a bypass duct compared to a volume of air delivered into said compressor, wherein said bypass ratio is greater than or equal to 12.0.

4. The gas turbine engine as set forth in claim 3, wherein said gear reduction having a gear ratio between the speed of a drive input to the sun gear, and an output speed of the fan rotor and said gear ratio being greater than or equal to 2.6.

5. The gas turbine engine as set forth in claim 4, wherein said gear ratio is greater than or equal to 4.0.

6. The gas turbine engine as set forth in claim 5, wherein said gear ratio is greater than or equal to 4.2.

7. The gas turbine engine as set forth in claim 6, wherein said gear ratio is less than or equal to 4.4.

8. The gas turbine engine as set forth in claim 5, wherein said fan drive turbine having three or four stages of blades.

9. The gas turbine engine as set forth in claim 5, wherein an auxiliary oil supply system provides oil to journal bearings associated with said four star gears during a windmilling condition of said fan rotor.

10. The gas turbine engine as set forth in claim 5, wherein at least one blade row in said turbine rotor has blades formed of a directionally solidified material.

11. The gas turbine engine as set forth in claim 1, wherein said gear reduction having a gear ratio between the speed of a drive input to the sun gear, and an output speed of the fan rotor and said gear ratio being greater than or equal to 2.6.

12. The gas turbine engine as set forth in claim 11, wherein said gear ratio is greater than or equal to 4.0.

13. The gas turbine engine as set forth in claim 12, wherein said gear ratio is greater than or equal to 4.2.

14. The gas turbine engine as set forth in claim 1, wherein said fan drive turbine having three or four stages of blades.

15. The gas turbine engine as set forth in claim 1, wherein an auxiliary oil supply system provides oil to journal bearings associated with said four star gears during a windmilling condition of said fan rotor.

16. The gas turbine engine as set forth in claim 1, wherein at least one blade row in said turbine rotor has blades formed of a directionally solidified material.

* * * * *